June 23, 1942.  J. G. ROBERTS  2,287,487
BOX FOR RAZOR BLADES
Filed Oct. 15, 1938   3 Sheets-Sheet 1

INVENTOR

June 23, 1942.  J. G. ROBERTS  2,287,487
BOX FOR RAZOR BLADES
Filed Oct. 15, 1938  3 Sheets-Sheet 2
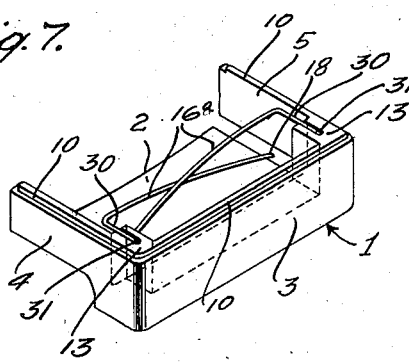
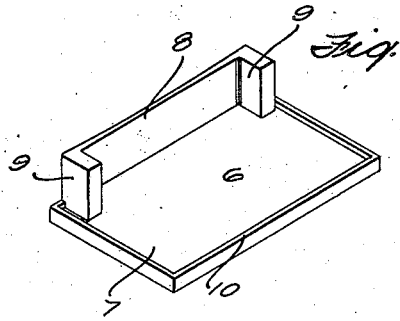
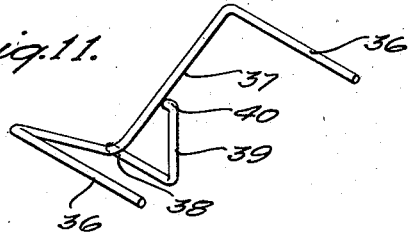
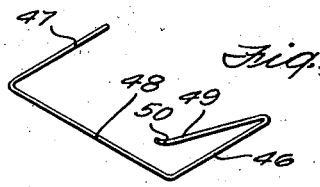
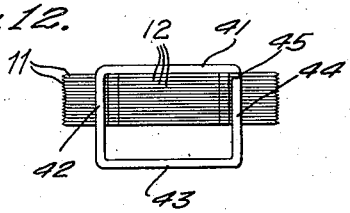
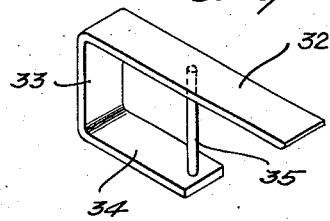
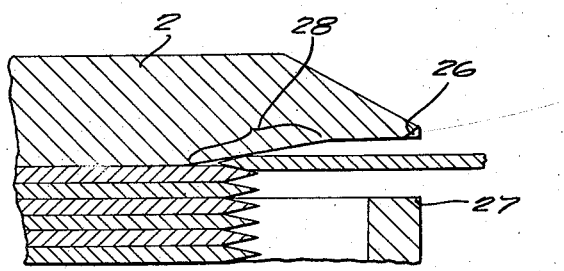
INVENTOR
John G. Roberts June 23, 1942.  J. G. ROBERTS  2,287,487
BOX FOR RAZOR BLADES
Filed Oct. 15, 1938  3 Sheets-Sheet 3
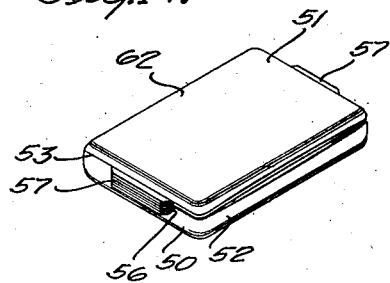
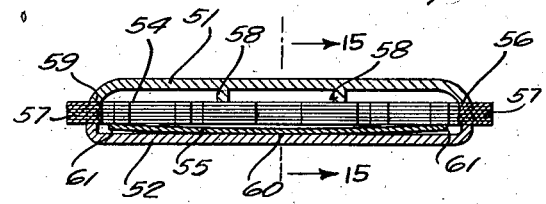
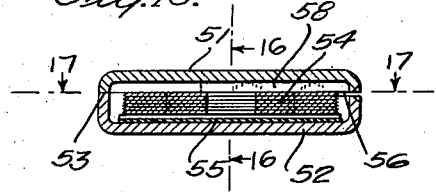
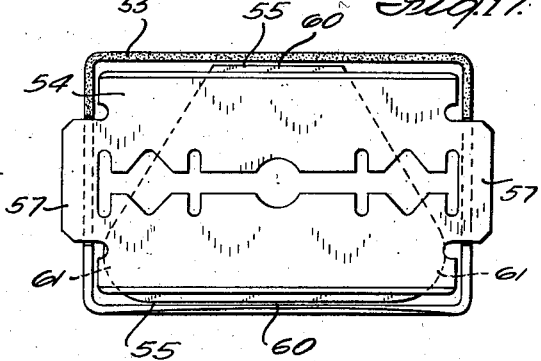
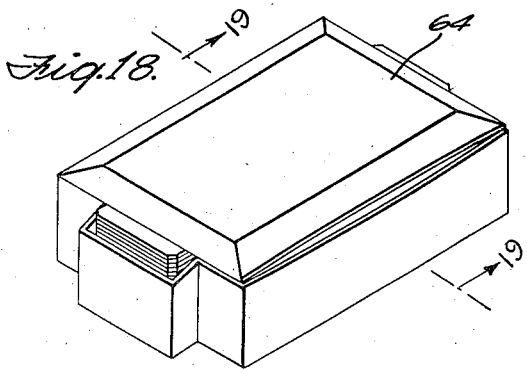
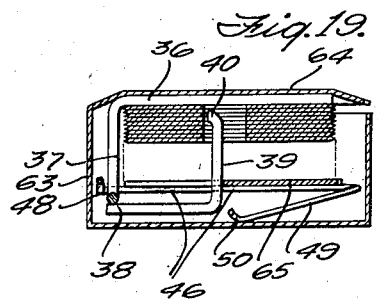
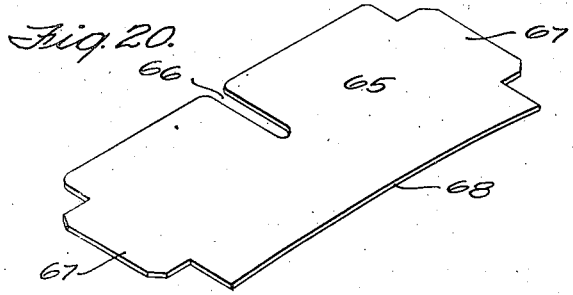
INVENTOR
John G. Roberts Patented June 23, 1942

2,287,487

UNITED STATES PATENT OFFICE 2,287,487

BOX FOR RAZOR BLADES

John G. Roberts, Dobbs Ferry, N. Y.

Application October 15, 1938, Serial No. 235,188

8 Claims. (Cl. 206—16)

This invention relates to dispensing containers for safety razor blades. It is especially applicable to packages wherein the blades are stacked face to face without individual coverage as by the heretofore customary paper wrappers. Its object generally stated is improved finger accessibility to the packaged blades together with simplification of the blade removal operation. The invention permits complete removal of one blade at a time instantaneously and in the safest and most natural way a sharp blade can be handled. It provides that the blade wanted, while resting normally in the container, may be engaged edgewise where not sharpened and immediately slid out from the stack under the control of such engagement. The stack of enclosed blades, in part or as a whole, may be grasped at the blade ends between finger and thumb whereupon by a straightaway movement of the hand in a direction transverse to the blade length the blade wanted and that one only will come out securely held just as it was initially grasped. As thus held it may be transferred to the razor without necessity of first laying it down or shifting the grip upon it. In particular therefore the object of the invention is to provide a blade holder adapted for the dispensing of the blades in this manner.

While not limited in its broadest scope to packages for conventional safety razor blades or in fact to any blade of given shape or contour, the invention as herein particularly described is adapted to box constructions and assemblies for blades that are made of wafer-like, flexible spring steel, have generally rectangular contours and are characterized by double shaving edges, narrow unsharpened end extensions and longitudinally extending perforations.

The objects stated, and others apparent from the specification, are attained by a box-like structure holding a blade pack and adapted for successive blade removals by finger access openings adjacent opposite end edges of the blades and through which such edges protrude far enough to permit secure edgewise finger engagement thereof together with a longitudinally extending dispensing opening along one wall of the box and in substantially the plane of the access openings. In order to limit the operation to the removal of a single blade at a time, the slot itself may but need not be reduced to blade dimensions. Instead and preferably abutment means within the box in position to obstruct the movement through the dispensing opening of all but one blade at a time may be provided for that purpose. In one form the abutment means may be a non-rigidly held gate inside the box. Viewed from the blade end such a non-rigidly held gate may have the general contour of a nearly closed rectangular loop. One section of it may rest, or, as aptly said, float, upon the surface of the topmost blade. Due to upward pressure exerted beneath the pack, the gate may contact the roof of the box. Another section, or series of sections, of the gate may extend around, but out of contact with, the rear side of the pack, thence beneath the pack and up, post-like, through the blade perforations to a point that is approximately a single blade thickness distance below an area defined by the lower surface of the upper section. In an alternative construction, two gate units of similar contour are used, one at each of the end extensions of the pack. By virtue of either of these floating gate arrangements, any distortion of the box, such as may be caused by undue pressure in handling it, which would alter the width of the slot in the box, does not affect the gate opening inside. With it, the box may be made of lighter weight, and the slot of generous or indeterminate width without sacrificing uniformity of operation. The gate may be constructed of sheet metal or wire and formed in various ways. It is preferable to widen or spread apart the upper section, leaving the area immediately around the central post open. Assembly is thereby simplified, as the gate may then be first formed completely, and afterwards threaded through the blade pack. When two gate units are used threading is eliminated, for the two units may be directly slipped in place over the end extensions, and reinsertion of blades is always blocked. Gates of the type referred to may be pressed into form and, at the same time, adjusted to the precise opening required; or they may be first pressed with too shallow an opening and, after that, milled, ground, sheared or trimmed in some other manner at the post end to the required single blade admittance dimension. Such floating gate constructions in part form subject matter of applicant's co-pending application, Serial No. 240,491, filed November 15, 1938.

Upward pressure on the pack is preferably secured by a spring, or a pair of springs, so made and positioned that the pack is upheld under light and approximately uniform pressure during the entire period of depletion. If the spring directly contacts the lowermost blade of the pack the pressure should be directed at or near the end extensions. Otherwise it is desirable to insert a dummy blade or plate of some rigid material between the spring and the pack. A pair of fine wire springs, substantially the length of the blade, anchored in the box ends and pressing against the blade ends serve the purpose very well. Or a pair of coiled springs of conical formation may be employed. A single spring of very simple shape and construction and well adapted to serve the purpose may be made of a short piece of spring wire, having a U shaped base in contact with the pack and a diagonally extending arm in contact with the box floor. In some box constructions, a flat spring substantially the width and contour of the blades is suitable.

The box may be made of plastic, sheet metal or other suitable material. If made of a plastic, it is preferably molded in two parts, one of which includes the roof and the other, the floor. The two side and two end walls may be molded integrally with either the roof or the floor, or in part with the roof and in part with the floor. If made of metal, the box may be constructed of one or more press punched parts.

Depleted condition of the pack is observable at the openings in the box ends, thus suggesting at the right time the need for a new package.

In the drawings, Figs. 1 to 9, inclusive, of which all except Figs. 7 and 8 are enlarged views, illustrate one embodiment of the invention; Fig. 1 being a general isometric view of the assembly; Fig. 2, an end view in section on line 2—2 of Fig. 3; Fig. 3, a front view in section on line 3—3 of Fig. 2, and showing a pair of blade lifting springs; Fig. 4, an end view in section on line 4—4 of Fig. 3; Fig. 5, a plan, from bottom, in section on line 5—5 of Fig. 2; Fig. 6, as isometric view of a floating gate; Fig. 7, an isometric, upside down, view of the upper part of the box and showing a pair of springs of an alternative form; Fig. 8, an isometric view of the lower part of the box; and Fig. 9, a greatly enlarged fragmentary view, on the same section line as that of Fig. 2, to show a detail of the box formation at the exit slot.

Figs. 10, 11 and 12 illustrate alternative gate constructions; Fig. 13, an alternative single piece spring construction.

Figs. 14 to 17, inclusive, illustrate an embodiment of the invention in which an exit slot in the box serves the purpose of limiting blade removals; Fig. 14 being an isometric view of the assembly; Fig. 15, an enlarged end view in section on line 15—15 of Fig. 16; Fig. 16, an enlarged front view in section on line 16—16 of Fig. 15; and Fig. 17, an enlarged plan in section on line 17—17 of Fig. 15.

Figs. 18 and 19 are enlarged views of an assembly in which the box is made of pressed sheet metal; Fig. 18 being an isometric view of the assembly; and Fig. 19, an end view in mid-section of Fig. 18.

Fig. 20 is an enlarged view of a dummy blade.

Figure 1:
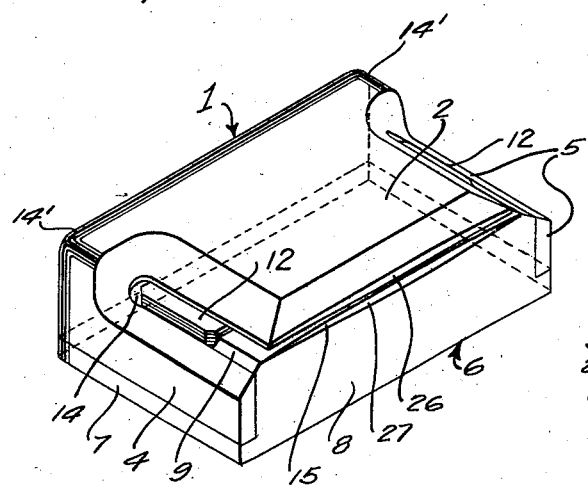

Referring to Figs. 1 to 9, the box is preferably of plastic material, such as Bakelite. As such it is molded in two parts: section 1, which includes the roof 2, rear side 3 and two ends 4, 5; and section 6, which includes the floor 7 and the front side 8. When the two sections are brought together, they interlock at short inward extensions 9 of the front side which fit within the forward portions of the ends. They also interlock along a two level formation 10 around three edges of the floor section and the lower edges of the rear side and ends of the roof section. The end extensions 12 of the blades 11 fit between the front side extensions 9—9 and similarly shaped enlarged corners 13—13 of the ends of the roof section. A limited number, for example four or five, of the blade end extensions 12 are partly exposed at the openings in the box ends, as shown at 14. For the purpose of such exposure the forward portions of the two upper end edges of the box appear as though cut away. Corners 14'—14', however, need not be so cut away but are left of ample bulk for the sake of improved box rigidity. An exit slot 15 is defined by the forward edge of the roof section and the upper edge of the front side of the floor section. It is wide enough of itself to admit about three blades at a time. This is in order that any considerable pressure in the handling of the device, if applied between the roof and the floor, will not effectively close the slot to the exit of at least one blade.

The box may be designed to hold any number of blades. As shown, the capacity is about fifty. In the several views, however, only a part of a full pack is shown, this better to illustrate the gate and spring construction and their assembly positions within. The blade pack is held to the roof, as shown most clearly in Fig. 3, by a pair of wire springs 16 anchored in holes at 17 in the lower edges of the box ends. These springs are so preset that they press upwardly at their outer or free ends 18 against the middle portion of the end extensions of the lowermost blade of the pack. Spring wire of .020" or .022" diameter is a suitable material for such springs. As the blade pack becomes smaller its weight decreases and the spring pressure correspondingly decreases so that appropriate uniformity is attained in net contact pressure of the topmost blade against the roof.

Figure 6:
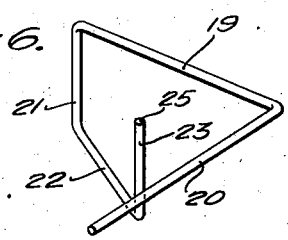

In Fig. 6 is shown, apart from its environment in the box structure, one form of the floating gate device. It is preferably formed of a piece of wire. The upper or floating section of it is defined by two arms 19, 20 disposed at an angle to each other and another section, or series of sections, extending at 21 downwardly between and clear of the rear side of the blade pack and the rear side of the box, forwardly at 22 between and clear of the bottom of the pack and the floor of the box and upwardly, post like, at 23 through the enlarged central part 24 of the blade perforations. Section 23 is likewise clear of the pack. It reaches to a point 25, which is blade distance below the level of the underneath surface of the floating section. The two arms 19, 20 defining this section rest on top of the blade pack and fit in grooves in the roof, by which they are loosely held against lateral displacement. The depth of groove should be about equal to the diameter of the wire. The gate device should not touch, or at least press against, the box or the blade pack except along arms 19, 20 so that distortion of the box by handling will not change the blade gap. Being loosely fitted to the grooves in the roof, the device is free to move downwardly with the pack in the event that pressure applied at the end extensions in removing a blade is enough to cause such movement. Section 22 should be suspended the distance of a little less than the gate wire diameter above the floor of the box so that the arms 19, 20 will be stopped from slipping entirely out of the grooves in the roof.

The box is manipulated for the removal of a blade by holding it in one hand at the corners 14'—14', or in any other convenient way, and, with the thumb and forefinger of the other hand, by pressing slightly downwardly and pinching inwardly on the topmost blade at the two exposed end extensions thereof for frictional engagement therewith. Then with a sidewise pull the blade comes out over the post 23 and through the slot 15. This operation amounts to simply a touch and pull at the pack. All but the topmost blade are obstructed by the post 23 and remain in place until the blade removed is out of the box, whereupon the springs 16 lift the remainder of the pack and the next blade takes its place for subsequent removal in the same manner.

Figure 2:
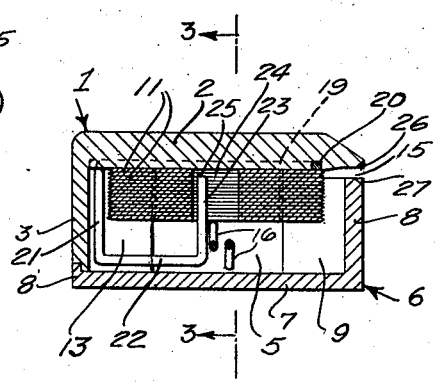
Figure 3:
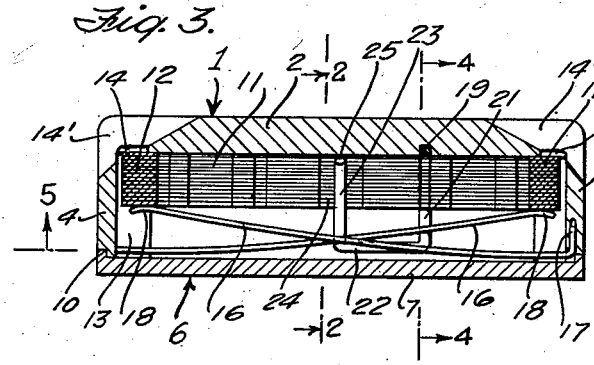
Figure 4:
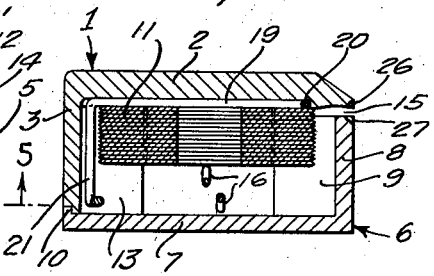
Figure 5:
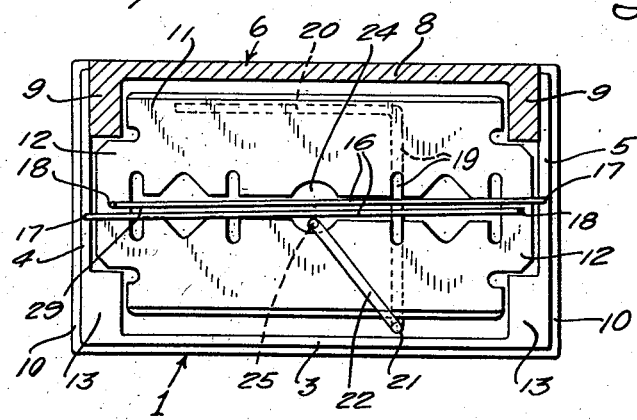

In order thoroughly to guard the sharpened edges of the blade from damage during removal, the top of the post at 25 is sloped a few degrees downwardly and forwardly towards the exit slot, as shown in Fig. 2. This slope is desirably less than that of the bevel at the blade edge, so that the shaving edge will not scrape over it, either in the removal of a blade or, if after partial removal, it should be pushed back into place. Similar precaution is taken by details of the box formation at the lips 26, 27 of the exit slot. This is shown most clearly in the enlarged view, Fig. 9. The underneath surface of the roof is here shown sloped slightly upwardly at 28, from a point behind to a point forward of the normal position of the bevel at the blade edge, so that, as one blade is passing out, scraping of two edges, one over the other, is avoided. Also the lips are bowed longitudinally slightly inwardly, as indicated most clearly in Fig. 1 so that upward or downward movement of the blade, if it should occur by accident or mishandling, as it emerges from the slot, would not result in damaging blade edge contact with the lips.

In Fig. 7 is shown an alternative form of wire spring. Here the springs 16a are shown as having right angle extensions 30, whereby they can be anchored in holes at 31 in the heavy corner sections 13. In assembling the box, the gate post 23, is first threaded through either end portion 29 of the blade pack perforations. This threading is possible because of the open area around the post section 23 between the arms 19, 20. The post section 23 is then slipped along the blade perforations and the gate as a whole is adjusted to its proper position on the pack. After this partial assembly, the blade pack with its now enclosing gate is placed within the top or roof section 1 of the box. The springs 16 are then forced into their anchoring holes at 17 or 31 with the ends 18 thereof pressing against the end extensions 12 of the lowermost blade. Finally the floor section is placed upon and may be cemented to the roof section.

An alternative form of gate is shown in Fig. 10. The upper or floating section 32, rear section 33 and bottom section 34 are formed, in one strap-like piece, of sheet metal and the upright or post section 35 is a wire soldered in a hole in, or welded to the surface of, section 34. This soldering or welding operation follows the placing of the blade pack within the strap sections, and fixes the correct opening at the blade gap. Here, as with the device of Fig. 6, the upper section is loosely held in a groove, in this case somewhat wider, in the roof of the box.

In Fig. 11 is shown another form of gate having merit in certain respects. It is made of two formed wire parts. One part comprises two parallel arms 36—36, which constitute the floating section, connected by a yoke 37, which is depressed midway to the lower level of the pack. The other part comprises an angular arm welded to the first part at 38. This latter arm extends upwardly, post-like, at 39 and slightly rearwardly at its tip 40. The correct blade gap, between the tip 40 and the area defined by the arms 36—36 is fixed in the welding operation. The purpose of tip 40 is to economize in the width of the box. This comes about because, with such a gate shape, less space allowance than would otherwise be necessary is required between post 39 and yoke 37 during the operation of adjusting the gate to its proper position about the pack.

In the partial assembly shown in Fig. 12, the blade pack 11 appears in end elevation, with one of a pair of gate devices slipped over an end extension. In this construction the upper or floating section 41 and the other sections 42, 43 and 44, loosely surrounding the extension on the rear, bottom and front sides thereof, form a nearly closed rectangle, as previously described with reference to the other gate devices, leaving a gap of blade depth at 45. Such gates effectively guard the box against re-entrance of a blade, once it is removed, for the upper section 41 then rests at the level of the upper surface of the next, now the topmost, blade and its abrupt end squarely meets the edge of any blade that the user may attempt to reinsert. It will be understood, also, that the box formation, in this instance, would be such that the device is retained in position without any binding effect that would distort its shape and so interfere with the proper performance of its function.

In Fig. 13 is shown a one piece spring. It comprises a U shaped base, the two parallel sections 46, 47 of which are adapted to press upwardly against the lowermost blade of the pack just inside the end extensions thereof. Joining these sections is a mid-section 48 and extending diagonally inward and downward from the free end of section 46 is a floor pusher section 49, with a slightly upturned end 50 to ease the friction at that point. The action of this spring, on being compressed beneath the pack in the box is as follows: Section 49 bends slightly, section 46 twists considerably, section 48 bows upwardly slightly and section 47 turns slightly but does not bend or twist. In these movements sections 46 and 47 remain parallel to each other, while end 50 slides over just a short path across the center of the box floor. The pressure applied is substantially vertical and equal to the two ends of the blade pack.

In the construction shown in Figs. 14 to 17, inclusive, where the slot in the box itself serves as the blade limiting gate, the box is formed of cast or heavy stamped metal in two parts comprising the roof 51 and floor 52 welded or soldered together along the line 53 after the blade pack 54, in this case of a small number of blades, with its uplifting spring 55 is assembled therebetween. The slot 56 is adjusted to blade depth at the time of such welding or soldering. At the two ends of this box, openings are provided for the blade end extensions 57. In the roof are ribs 58, the lower surfaces of which are in the same plane as the surfaces 59 which define the upper boundary of the end openings. This is to insure that the blade pack will be undistorted by the compression of the spring 55. The spring is bowed in such a way that the central line 60—60 pushes against the floor and its ends at 61—61 press upwardly against the blade pack. The offset shape of this spring is to insure that the forward half of the topmost blade of the pack shall be at the right level for entering the exit slot. To operate this box it may be held upon any flat surface by slight finger pressure just above the rear side, say at 62, or in any other manner that will not cause closing of the slot. Then with the thumb and finger of the other hand the topmost blade is extracted in the manner previously described.

The gate and spring shown, respectively, in Figs. 11 and 13 are especially adapted to metal box constructions such as the one illustrated in Figs. 18 and 19, but may likewise be usefully employed in boxes of plastic. As shown in their relative positions in Fig. 19, the mid-section 48 of the spring occupies space inside the rear wall 63 and behind the mid-section 37 of the gate. Also the two parallel arms 36—36 of the gate contact the roof 64 of the box, but in this case are loosely held there by conformity to the shape of the roof. The arrangement is such that the two parallel sections 46, 47 of the spring press approximately in direct line upwardly towards the arms 36—36 of the gate, so that there is no tendency to distortion of the blades when the pack is nearly depleted. To further avoid such distortion, which otherwise might occur by finger pressure on the blade end extensions, a dummy blade or rigid plate 65 may be inserted as shown in Fig. 19 between the blade pack and the spring. As the blade pack is reduced to the last blade, the mid-section 48 of the spring approaches its uncompressed straight line condition. However, it is still somewhat bowed upwardly. The space under the roof at the rear of the box, however, is sufficient to allow for such residual bowing. A suitable dummy blade or plate, for the purpose stated, is shown in Fig. 20. It has the general contour of an ordinary blade, but is slotted at 66 so that it may be slipped into place around the post 39. This dummy blade may be given a distinctive color at the end extensions 67 to attract the eye more readily to approaching depletion of the pack. It may also be curved inwardly on the front edge as indicated at 68 to avoid edge damage in the withdrawal of the last blade.

I claim:

1. A rectangular box having top, side and end walls which define a chamber having its transverse dimensions in length and width substantially those of a safety razor blade, the said box having a continuous coplanar U-shaped dispensing slot adjacent the top wall, said slot having its mid portion extending through a side wall longitudinally of the box and each end portion extending around an adjacent corner of the box and continuing along an end wall, the corners of the box adjacent the end portions of the slot being cut away along said portions to expose the ends of a razor blade positioned within the box sufficiently for finger engagement by an operator.

2. A hollow elongated rectangular box the walls of which define a chamber having its transverse dimensions in length and width substantially those of a conventional double edged safety razor blade, the top wall of said chamber also having dimensions substantially those of said transverse dimensions, the said box being closed on top and all transverse sides with the exception of a continuous coplanar U-shaped dispensing slot adjacent the top wall, said slot having its mid portion extending through a side wall longitudinally of the box and each end portion extending around an adjacent corner of the box and continuing along an end wall for a distance more than half the width of the box, the transverse corners of the box immediately adjacent the end portions of the slot being cut away entirely along said portions and on each side of the same to expose the ends of a razor blade positioned within the box sufficiently to be contacted by the fingers of the hand of an operator.

3. A hollow elongated rectangular box the walls of which define a chamber having its transverse dimension of a length and width substantially that of a conventional double edged safety razor blade, the top and bottom walls of said chamber also having a dimension substantially that of said transverse dimension, the said box being closed on all sides with the exception of a continuous coplanar U-shaped dispensing slot adjacent the top wall, said slot having its mid portion extending through a side wall longitudinally of the box and each end portion extending around an adjacent corner of the box and continuing along an end wall for a distance more than half the width of the box, the transverse corner of the box immediately adjacent each said end portion of the slot being cut away entirely along said portion and on each side of the same to expose the end of a razor blade positioned within the box sufficiently to be engaged by a finger of the hand of an operator.

4. A box the sections of the walls of which define a chamber having its transverse dimension of a length and width substantially that of a conventional double edged safety razor blade, the said box having an elongated dispensing opening adjacent the top section, said opening having its mid portion extending along a side section longitudinally of the box and each end portion extending around an adjacent corner of the box and continuing along an end section, the transverse corner of the box immediately adjacent each said end portion of the opening being cut away entirely along said portion, and on each side of the same to expose the end of a razor blade positioned within the box sufficiently to be engaged by a finger of the hand of an operator, the said cut away portions providing smooth parallel finger guiding tracks.

5. A box the sections of the walls of which define a chamber having its transverse dimensions in length and with substantially those of a safety razor blade, the said box having an elongated dispensing opening adjacent the top section, said opening having a longitudinal portion extending entirely along a side section and at least one end portion extending around an adjacent corner of the box and continuing along an end section for a distance more than half the width of the box, the transverse corner of the box adjacent the said end portion of the opening being cut away entirely along said portion to expose the end of a razor blade positioned within the box sufficiently to be engaged by a finger of the hand of an operator, the cut away portion providing a smooth finger guiding track.

6. A box the sections of the walls of which define a chamber having its transverse dimensions in length and width substantially those of a safety razor blade, the said box having an elongated blade dispensing opening adjacent the top section wide enough to admit more than one blade at a time, said opening having a mid portion extending along a side section and end portions each extending around an adjacent corner of the box and continuing along an end section, the transverse corners of the box adjacent the end portions of the opening being cut away entirely along said portions to expose the opposite end edges of a plurality of razor blades positioned within the box sufficiently for two-finger engagement by an operator, and abutment means within the box in position to obstruct the movement through said opening of all but one blade at a time, the said cut away portions providing smooth finger guiding tracks.

7. A razor blade package comprising a box having several walls and a stack of razor blades in face contact with each other enclosed therein, said box having finger access openings adjacent opposite end edges of the blades and a longitudinally extending dispensing opening along one edge of one wall joining the access openings and in substantially the same plane as that of the access openings, said dispensing opening being in position to permit the edgewise removal of at least one blade at a time, the said opposite edges of the blades protruding through said access openings far enough to permit secure edgewise finger engagement of the said blade and its removal by an operator through said dispensing opening while so engaged.

8. A box for holding a stack of safety razor blades in face contact with each other, said blades being of a type having a rectangular body part, at least one longitudinally extending sharp edge and a narrow unsharpened end part at each end of the body part, the wall sections of said box defining a chamber having its transverse dimension of a length and width substantially that of the body part of the blades, said box being closed on all transverse sides with the exception of an elongated dispensing opening adjacent the top of the box, said dispensing opening having a mid portion extending along the upper edge of a side section of the box and end portions each extending around an adjacent corner of the box and continuing along an end section thereof and terminating at an enlarged portion in the mid part of said end section, said enlarged portion being of a size and shape to surround the end parts of the blades conformably while permitting said end parts to protrude beyond the end section of the box sufficiently to be engaged by the finger of the hand of an operator, and said end portion of the dispensing opening between the mid portion and enlargement thereof being of appropriate width in relation to the thickness of a blade to permit the passage of one blade at a time through said dispensing opening.

JOHN G. ROBERTS.